US012526136B2

(12) United States Patent
Bernsen (10) Patent No.: US 12,526,136 B2
(45) Date of Patent: Jan. 13, 2026

(54) SECURELY CHANGING CRYPTOGRAPHIC STRENGTH DURING RECONFIGURATION (71) Applicant: KONINKLIJKE PHILIPS N.V., Eindhoven (NL)

(72) Inventor: Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 68 days.

(21) Appl. No.: 17/922,454

(22) PCT Filed: Apr. 28, 2021

(86) PCT No.: PCT/EP2021/061037
§ 371 (c)(1),
(2) Date: Oct. 31, 2022

(87) PCT Pub. No.: WO2021/219674
PCT Pub. Date: Nov. 4, 2021

(65) Prior Publication Data
US 2023/0171097 A1 Jun. 1, 2023

(30) Foreign Application Priority Data

May 1, 2020 (EP) ..................................... 20172609
Jun. 22, 2020 (EP) ..................................... 20181399
(Continued)

(51) Int. Cl.
H04L 9/08 (2006.01)
H04L 9/30 (2006.01)
(Continued)

(52) U.S. Cl.
CPC ............... H04L 9/088 (2013.01); H04L 9/30 (2013.01); H04L 9/32 (2013.01); H04W 12/03 (2021.01)

(58) Field of Classification Search
CPC . H04L 9/088; H04L 9/30; H04L 9/32; H04W 12/03
See application file for complete search history.

(56) References Cited

U.S. PATENT DOCUMENTS 9,521,589 B2   12/2016  Lee
10,169,587 B1 *  1/2019  Nix ..................... H04W 12/041
(Continued)

FOREIGN PATENT DOCUMENTS

EP    3065433 A1 *  9/2016  ......... H04L 63/0428
JP    2017041753 A    2/2017
WO   2019229026 A1  12/2019

OTHER PUBLICATIONS

Anonymous: Draft Device Provisioning Protocol Specification Version. 1.2 wi-fi alliance Mar. 3, 2020. p. 1-174.
(Continued)

Primary Examiner — Esther B. Henderson (57) ABSTRACT

There is provided a method, Configurator and Enrollee devices and a system thereof. The method is one of configuring an Enrollee device for communications in a wireless network, the method be arranged for execution by a Configurator device (9) and an Enrollee device. The Configurator and Enrollee devices may be arranged to communicate using a wireless communication protocol and participate in a configuration protocol, the configuration protocol being arranged to configure the Enrollee device to communicate in the wireless network, the Enrollee device having been previously configured to communicate in the wireless network. The method comprises executing a configuration protocol, which comprising sending by the Configurator device a message comprising an indication of a selection of a type of public key, the type of public key being selected from a plurality of types of public key obtained from the Enrollee device, wherein the type of public key selected is
(Continued)

to be used for a specific purpose and the type of public key selected is different from a previous type of public key used by the Enrollee device for the same specific purpose as part of a previous configuring of the Enrollee device to communicate in the wireless network.

19 Claims, 4 Drawing Sheets

(30) Foreign Application Priority Data

Jul. 13, 2020  (EP) ..................................... 20185523
Apr. 7, 2021  (EP) ..................................... 21167205

(51) Int. Cl.
*H04L 9/32* (2006.01)
*H04W 12/03* (2021.01)

(56) References Cited

U.S. PATENT DOCUMENTS

| | | |
|---|---|---|
| 2009/0227282 A1 | 9/2009 | Miabayashi et al. |
| 2011/0275316 A1 | 11/2011 | Suumaeki |
| 2015/0139418 A1* | 5/2015 | Nocera ................... G06F 21/33 380/44 |
| 2015/0249946 A1 | 9/2015 | Oh |
| 2018/0109381 A1* | 4/2018 | Cammarota ........ H04W 12/041 |
| 2018/0124654 A1 | 5/2018 | Kim |
| 2018/0375870 A1 | 12/2018 | Bernsen |
| 2020/0280436 A1* | 9/2020 | Nix ........................ H04L 9/3066 |
| 2021/0099305 A1* | 4/2021 | Shibata ............... H04L 63/0853 |
| 2023/0032852 A1 | 2/2023 | Wang et al. |

OTHER PUBLICATIONS

International Search Report and Written Opinion from PCT/EP2021/061037 mailed Jun. 8, 2021.

McGrew et al "Fundamental Elliptic Curve Cryptography Algorithm" Internet Engineering Taskforce Feb. 2011.

Lochter et al "Elliptic Curve Cryptography Brainpool Standard Curves and Curve Generation" Independent Submission Mar. 2010.

Cooper et al Internet X.509 Public Key Infrastructure Certificate and Certificate Revocation List (CRL) Profile, Network Working Group Request for comments May 2008.

Barler et al "Recommendation for Pair-Wise Key-Establishment Schemes Using Discrete Logarithm Cryptography" NIST Special Publication 800-56A, Apr. 2018.

WIFI Easy Connect Specification Version 2.0 (2020).

Harkins "Crytp Agility for DPP: Generating a Connector for a Different Curve" Mar. 2, 2021 WIFI Alliance.

NFC Forum. Connection Handover Technical Specification, Version 1.4 (Apr. 30, 2018). NFC Forum.

Wi-Fi Peer-to-Peer (P2P) Technical Specification, Version 1.5. (2014) Wi-Fi Alliance.

Sousa, P.R et al., "pTASC: Trustable Autonomous Secure Communications". ICDCN Jan. 4-7, 2019, Navi mumbai, India.

* cited by examiner

SECURELY CHANGING CRYPTOGRAPHIC STRENGTH DURING RECONFIGURATION

CROSS REFERENCE TO RELATED APPLICATIONS

This application is a U.S. national phase application of International Application No. PCT/EP2021/061037 filed on Apr. 28, 2021, which claims the benefit of EP Application Serial No. 20172609.8 filed May 1, 2020, EP Application Serial No. 20181399.5 filed Jun. 22, 2020, EP Application Serial No. 20185523.6 filed Jul. 13, 2020 and EP Application Serial No. 21167205.0 filed Apr. 7, 2021 and are incorporated herein by reference.

FIELD OF THE INVENTION

The present invention relates to devices and methods for use in wireless networks, in particular those conforming to the IEEE 802.11 family of standards.

BACKGROUND OF THE INVENTION

Figure 1:
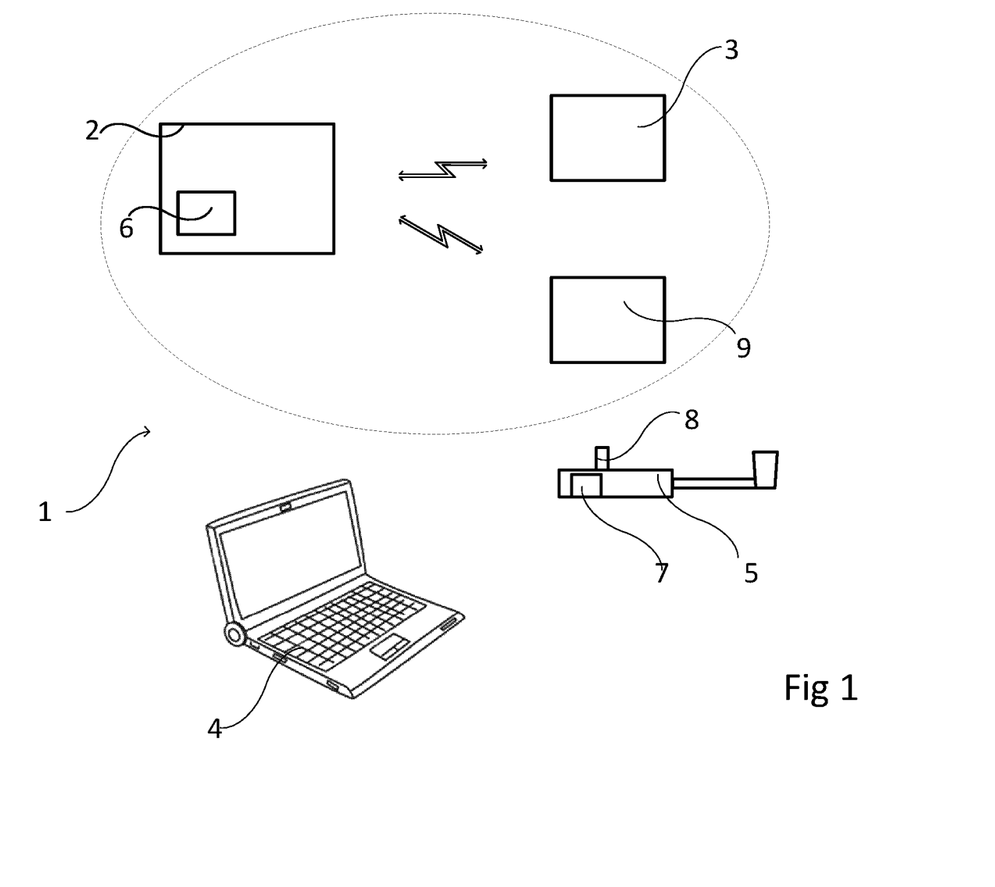
FIG. 1 represents a wireless network for which it is desired to configure devices for addition.

FIG. 1 represents a wireless network 1 which contains a first device 2 and another device 3. The first device 2 may have a central function and be like an Access Point (AP), a hub or a gateway device. The first device 2 will henceforth be referred to as an AP for simplicity though other types of device are indeed possible. The user (not shown) wishes to add two more devices to the network 1, namely a complex device 4 (here represented as a computer) and a simple device 5 (here represented as a toothbrush). Devices like the simple device 5 often do not have any real user interface (UI) other than perhaps a light and, accordingly, are often called 'headless' devices. The AP 2 has a processor 6 and the simple device 5 has a microcontroller and small non-volatile memory 7 and a button 8 which may be used to reset the simple device 5. There is also a third device 9. The simple device 5 may even not have a specific reset button. The wireless network uses a wireless communication technology such as one based on IEEE 802.11 though other technologies may be also suitable.

Some wireless networking standards allow for one device to configure another in order to establish a connection and communicate. This makes the task of adding, or enrolling, a new device in a network less onerous in that the user no longer has to make manual entries. The device requiring configuration in order to join the network may be called an 'Enrollee' and the device performing the configuration may be called a 'Configurator'.

It is desirable that trust be established between the Configurator, the Enrollee and, ultimately, the network to which the Enrollee is destined to be connected. 'Trust' in this context can be understood as meaning that devices being configured are the intended devices and that other, malicious devices cannot intervene in the connection. To this end, the communications are often encrypted.

Diffie-Hellman, see reference document [DH], is a well-known technique for establishing a secret key between two parties, where the communication between the parties for establishing the secret key does not reveal any information to third parties on the established secret key. The two parties each use their own public/private key pair and exchange the public key with each other. Each party is able to compute the secret key using its own private key and the other party's public key and possibly some other information, e.g. a nonce (random number) from each party. Each party may generate a key pair anew each time it performs Diffie-Hellman or it reuses an older key pair.

The Device Provisioning Protocol (DPP) of the Wi-Fi Alliance, see reference document [DPP], uses Diffie-Hellman to establish a secret key between two devices, the DPP Enrollee that wants to be configured and the DPP Configurator that is able to configure DPP Enrollees, so these can get access to a DPP enabled network or can set up a DPP enabled network as an Access Point (AP), see reference document [802.11].

When performing Diffie-Hellman over a network, a device that receives a public key for performing Diffie-Hellman does not know from which device this public key is. This may be exploited by an attacker in a so-called man-in-the-middle attack. An attacker E might masquerade as the real device B with which device A wants to connect. The attacker E performs Diffie-Hellman with device A and establishes a secret key Kae with device A. Similarly, the attacker masquerades as device A to device B and establishes a secret key Kbe with device B. When a message comes in from one of the devices A or B, the attacker decrypts the message with the one secret key, encrypts it with the other and forwards it to the other device. This way, the devices A and B do not notice anything strange in their communication, except for some extra delay. When they check their communication by sending the same information using another way of communication and comparing the results, they will not notice any tampering with their communication. But the attacker has complete knowledge on what they communicate.

One way to prevent man-in-the-middle attacks and ensure trust is to use an additional protocol, a so-called Out-Of-Band (OOB) communication, for exchanging the public keys, or hashes of the public keys. The OOB communication may be a short-range wireless communication protocol such as Wi-Fi [802.11], Bluetooth [BT], 802.15.4 [802.15.4], ZigBee [ZIGBEE], Near Field Communication [NFC]. Alternatively, the OOB communication may involve the Configurator obtaining the public keys by a technique such as scanning a QR-code associated with the Enrollee device, from which it either decodes the public key(s).

In this way, the user of a device knows that the public key received OOB is from the intended device because it they can verify the association of QR-code and Enrollee or because the Enrollee within the operating range of the OOB communication protocol. In the case the hash of public keys is exchanged OOB, the device can check whether the public key received via the communication protocol that needs to be encrypted leads to the same hash as the hash received OOB. Note that the use of the term communication protocol in this document encompasses multiple layers of the ISO-OSI model, including the physical layer for transceiving.

By way of a concrete example, the case of an Enrollee configured using the Device Provisioning Protocol (DPP) (https://www.wi-fi.org/downloads-public/Wi-Fi_Easy_Connect_Specification_v2.0.pdf/35330) will be considered. This protocol is also known under the name Wi-Fi Easy Connect.

In DPP, Elliptic Curve Cryptography [RFC 6090] is used for all asymmetric cryptography, especially the Network Access Key (NAK) and the Configurator signing key. The mandatory to support ECC curve is P-256.

Suppose an Enrollee (this can be an AP or a Wi-Fi device that can associate with an AP) has been configured by a Wi-Fi Easy Connect Release 2 Configurator using ECC curve P-256 for its Network Access Key (netAccessKey or NAK). That implies that the Enrollee has used a P-256 bootstrapping key, because the curve of these two must be the same in DPP R2. The Configurator may have used a different curve than P-256 for its signing key.

The user wishes to upgrade the security of the network such that P-256 is no longer used but a stronger curve instead. This means that the AP and all devices that are allowed on its network must be newly configured. Or a user wants to create a DPP network using another preferably stronger curve than the mandatory to implement P-256, such as P-384.

The requirement of managing a security upgrade means that a way of handling the new keys/key types is needed in addition to a way for simple devices to handle the new request. In particular, the DPP protocol does not provide for the situation of a 'security upgrade.

SUMMARY OF THE INVENTION

Thus there is a need to provide a method of re-configuring an Enrollee device for communications in a wireless network comprising performing a configuration protocol.

There is provided a method of configuring an Enrollee device for communications in a wireless network. The method is arranged to be executed by a Configurator device and an Enrollee device, the Configurator and Enrollee devices being arranged to communicate using a wireless communication protocol and participate in a configuration protocol, the configuration protocol being arranged to configure the Enrollee device to communicate in the wireless network, the Enrollee device having been previously configured to communicate in the wireless network. The method comprises executing a configuration protocol, the configuration protocol comprising sending by the Configurator device, using the wireless communication protocol, a message comprising an indication of a selection of a type of public key, the type of public key being selected from a plurality of types of public key obtained, by the Configurator device, from the Enrollee device, wherein the type of public key selected is to be used for a specific purpose and the type of public key selected is different from a previous type of public key used by the Enrollee device for the same specific purpose as part of a previous configuring of the Enrollee device to communicate in the wireless network.

This allows the Configurator and Enrollee devices to agree on a new type of key, preferably a stronger one in cryptographic terms and complete a bootstrapping and authentication protocol. In many situations, the Enrollee devices are arranged to 'lock out' further configuration when they have been successfully configured. Such a measure provides some security from the network in that malicious devices are prevented from using a reconfiguration of a device in the network as a way to gain access. User wishing to reconfigure the network to use stronger cryptography is hence present with the need to reset these Enrollee devices. This, while being a nuisance in itself, may be rendered even more problematic by some device being installed in remote or hard-to-access locations—for example lighting fixtures. The method also allows the reconfiguration to occur using the improved strength cryptography from the outset, as opposed to starting it using the existing, less strong, configuration.

In an embodiment, the message causes a re-initiation of an authentication protocol between the Configurator device and the Enrollee device.

By performing a new run of the authentication protocol, the authentication of Enrollee and Configurator may subsequently be performed using the improved strength cryptography.

In an embodiment, the public key of the type of public key is a Device Provisioning Protocol (DPP) Bootstrapping, a network access or protocol key.

In an embodiment, the Configurator device compares the type of public key to an indication of the type of public key stored during a previous configuring of the Enrollee device.

In an embodiment, the Configurator device selects an Enrollee bootstrapping key for use in the re-initiated authentication protocol, wherein the Enrollee bootstrapping key is obtained during a previous configuring of the Enrollee device to communicate in the wireless network.

This allows the Configurator to select a new type of public key without the potentially burdensome re-acquisition of the types of public key which the Enrollee device may use. For example, this could avoid having to scan multiple QR-codes.

In an embodiment, the Enrollee device replies to the message from the Configurator device comprising an indication of a selection of a type of public key, the reply message containing an identity of the Enrollee used during a previous configuring of the Enrollee device, the Configurator using the identity of the Enrollee to select the Enrollee key.

This allows the Configurator device to select automatically the Enrollee key in the event that it has keys and key types for multiple Enrollees. This feature may also offer additional security in that if the identity is not recognized as being one previously configured, an alert may be provided to the user. This could occur as a result of a malicious device attempting to join the network or just be a result of an error on the part of the user—for example the Enrollee device was never actually configured. The user may then check for problems and, where applicable, start a completely new configuration by using the appropriate out-of-band method.

Additionally, to the information already present in the DPP Reconfiguration Authentication Response specified by DPP R2 [DPP], the Enrollee may also include an Enrollee bootstrapping key of the by the Configurator newly desired curve type. This Enrollee bootstrapping key should preferably be put in the encrypted part of the DPP Reconfiguration Authentication Response message. The advantage of this is that the user of the Configurator does not have to scan a QR code, touch NFC, etc. which is very user friendly.

In an embodiment, the Enrollee device sends a message comprising a cryptographic hash of information comprising an Enrollee key. Thus causing the authentication to progress.

In an embodiment, the Enrollee device is a simple device. The method allows automatic reconfiguration of even simple or headless devices without the cumbersome requirements of manually resetting such devices.

In an embodiment, the message from the Configurator device comprises an indication that the selection of the type of public key is a new selection.

This allows the message to processed by both an Enrollee device according an embodiment and a legacy Enrollee. In such a case, the Enrollee device according to an embodiment will be reconfigured with the new type of public key whereas the legacy device will be able to continue with the type of key it has been using. This may be useful in networks where lower security devices may be tolerated because them having a limited role.

In an embodiment, the configuration protocol is according the Device Provisioning Protocol (DPP).

There is also provided an Enrollee device arranged to be re-configured by a Configurator device for communication in a wireless network, the Enrollee device being arranged to participate in a configuration protocol, the configuration protocol being arranged to configure an un-configured Enrollee device, provide a plurality of types of public key arranged to be used in the configuration protocol and provide at least one public key for each type of public key provided, connect to a network as a result of being configured, to set itself to a state able to be configured as a result being unable to connect to the network, and to receive a message, and to use a type of public key selected by the Configurator device from the plurality of types of public key in the configuration protocol and where receipt of the message causes a re-initiation of an authentication protocol between the Configurator device and the Enrollee device.

This allows the Enrollee device to participate in the reconfiguration without a manual reset and without the exchange of any secret keys over connections using less secure cryptography.

In an embodiment, the Enrollee device is configured to reply to the message with a reply message comprising in indication of the identity of the Enrollee device, the identity of the Enrollee device having been used during a previous configuring of the Enrollee device.

In an embodiment, the Enrollee device is a simple device.

There is also provided, a device arranged to act as a Configurator device and being arranged to re-configure an Enrollee device for communication in a wireless network, the device comprising a transceiver arranged for transceiving according to a communication protocol, the device being arranged to participate in a configuration protocol, obtain, from the Enrollee device, an indication of a plurality of types of public key to be used as part of the configuration protocol, select a type of public key from the indication, wherein the type of public key selected is to be used for a specific purpose and the type of public key selected is different from the type of public key used by the Enrollee device for the same specific purpose as part of a previous configuring of the Enrollee device to communicate in the wireless network, and send a message, using the transceiver, to the Enrollee device, the message comprising an indication of a type of public key selected, by the Configurator, from the plurality of types of public key.

A Configurator device so-arranged is able to automatically detect that the Enrollee device is ready to engage in what is a reconfiguration with an Enrollee device according to an embodiment. The Configurator device is able to select a new type of key, such as a new curve, without the user having to intervene manually—such as scanning multiple QR-codes. Particularly, this avoids the user having to engage in any trial and error processes of finding a new curve for bootstrapping that the Enrollee device can accept.

In an embodiment, the message causes a re-initiation of an authentication protocol between the Configurator device and the Enrollee device.

In an embodiment, the configurator device is arranged to obtain and store the plurality of types of public key and at least one public key according to an obtained type of public key during a previous configuring of the Enrollee device to communicate in the wireless network.

In an embodiment, the Configurator device is arranged to select the public key from the stored plurality of public keys.

The advantage of having the Configurator store the types of key for a possible future use is that the user no longer has to find information relating to the Enrollee device (such as QR-codes), information which may be hard to find since the initial installation.

In an embodiment, the Configurator device is arranged to receive and process a reply message from the Enrollee device, the reply message comprising an indication of Enrollee device identity to select a type of public key from the stored plurality types of public key.

In an embodiment, the Configurator device is arranged in include an indication that the selection of a type of public key is a new selection.

There is provided, also, a system comprising an Enrollee device according to an embodiment and a Configurator device according to an embodiment.

There is also provided a computer program product when operated on a processor in an Enrollee device causes the Enrollee device to execute the method according to an embodiment.

There is also provided a computer program product when operated on a processor in a Configurator device causes the Configurator device to execute the method according to an embodiment.

BRIEF DESCRIPTION OF THE DRAWINGS

The above, as well as additional objects, features and advantages of the disclosed devices, systems and methods, will be better understood through the following illustrative and non-limiting detailed description of embodiments of devices and methods, with reference to the appended drawings, in which.

The figures are purely diagrammatic and not drawn to scale. In the Figures, elements which correspond to elements already described may have the same reference numerals.

DETAILED DESCRIPTION OF THE EMBODIMENTS

In the following description, same references designate like elements.

Figure 2:
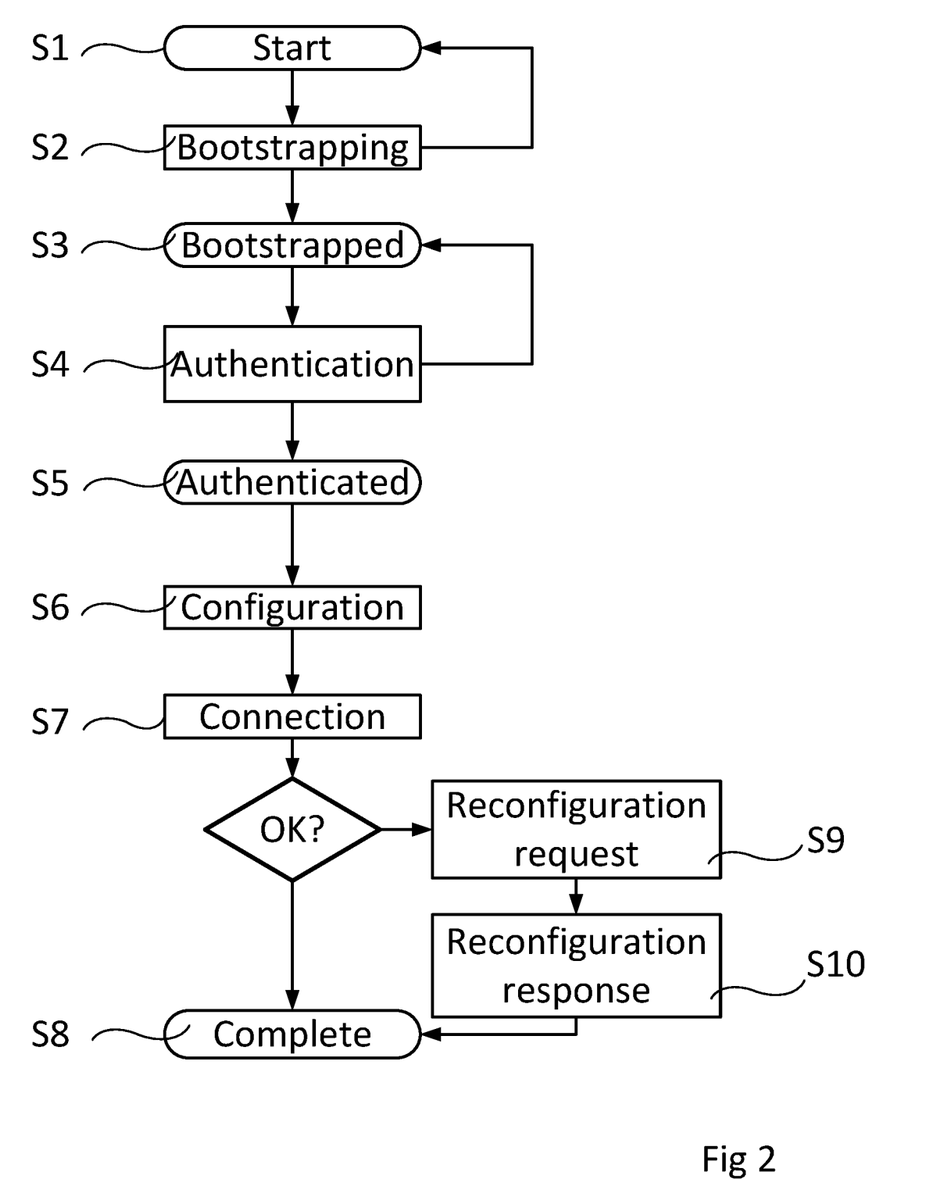
FIG. 2 represents the flow of a configuration process.

FIG. 2 represents a flow of a device-controlled configuration whereby one device such as the third device 9 of FIG. 1 may configure and connect to another device such as the complex or simple devices 4, 5 of FIG. 1. As an example, the case of the simple device 5 will be discussed. It should be understood, that though much of this description provides examples involving a network with a device like the AP 2, the process could work in a peer-to-peer situation. This configuration flow may be used for configuring a device which is in an un-configured state or is not yet able to connect.

One example of a device-controlled configuration method is the Device Provisioning Protocol (DPP) which is used in networks using Wi-Fi or IEEE 802.11. In the Device Provisioning Protocol (DPP), a device acting as a DPP Configurator can securely configure any Wi-Fi enabled device for connecting to a Wi-Fi AP.

At S1 (Start), the process starts with the two devices 9 and 5 in an unconnected state and device 5 is un-configured. For the purposes of discussion, device 9 will be used to configure device 5 for joining the wireless network 1 so device 9 may be referred to as the Configurator and device 5 as the Enrollee (since it is being 'enrolled' in the wireless network 1).

At S2 (Bootstrapping), often referred to as 'bootstrapping', whereby one device, the Initiator, obtains the bootstrapping public key ($B_R$) of the other device, the Responder. When mutual authentication is desired by the Responder device, it too obtains the bootstrapping public key ($B_I$) of the Initiator. This is achieved by another means than the wireless communication technology and so is commonly called 'out-of-band' communication (OOB). Examples of this can be the user causing one device to read a QR code on the Responder, NFC communication between the two device or another wireless technology e.g. Bluetooth. The bootstrapping process is initiated by a user intervention. If the bootstrapping has been successful, the process arrives as S3 (Bootstrapped) and the devices 10, 5 are 'bootstrapped', otherwise they revert to the 'start' state at S1. In either case, the Enrollee device (in this case the simple device 5) may record in an appropriate storage, for example as a flag in a register in memory, the result of the bootstrapping process. Frequently, simple devices are programmed to wake up after manufacturing or after a reset and turn on their radio on the channel indicated in their QR-code for configuration and start listening for an authentication request message At S4 (Authentication), the devices 9, 5 perform an authentication procedure whereby the devices establish 'trust' i.e. the user is able to be confident that the devices are what they believe them to be and not other unknown (and potentially malicious) devices 'pretending' to be one or other of the devices in question. A message is sent from one device requesting to start an authentication. This message can be sent by either the device doing the configuring (Configurator) or the device to be configured, the Enrollee. In this example, the third device 9 acts as the Configurator and the simple device 5 as the Enrollee. It should be noted that the third device 9 is shown as being connected to the network 1 though this is not necessarily required for the embodiments to work. The device starting the wireless communication is called the Initiator and the device responding is called the Responder. The DPP protocol, in particular, allows both a Configurator and an Enrollee device to act as the Initiator of the DPP protocol, whereby the other device automatically becomes the Responder. Simple devices or headless device usually will assume the Responder role.

The other device responds to this message. If the authentication request message is decoded correctly and contains the information indicating that the Initiator is the device the Responder device believes it to be and has the required capabilities, the response message indicates that the message has been 'accepted' and contains information needed by the Initiator to verify the credentials of the Responder and that it too has the required capabilities. If the two devices do not receive from the other device the required information, the process aborts and the device return to the bootstrapped state at S3. If the Initiator is the Enrollee, the authentication request message may also contain an additional part indicating the result of a previous attempt to configure the Enrollee. If the Responder is the Enrollee, then the authentication response message may contain the additional part indicating the result of the previous attempt. It should be understood that the indication also indicates whether or not there has been a previous attempt.

In the case of the DPP protocol, the first message is the Authentication Request message and the response message is the DPP Authentication Response. The Responder checks the DPP Authentication Request message contains a correctly generated cryptographic hash of the Responder public bootstrapping key and whether it has a copy of the Initiator's public bootstrapping key. The responder sends a DPP Authentication Response message indicating whether the authentication can continue. If not, because for example the attempt to decrypt an encrypted nonce in the DPP Authentication Request message fails, the process is aborted. The DPP Authentication Response contains a cryptographic hash of the Responders public bootstrapping key and may contain the hash of the Initiator public bootstrapping key. Likewise, for the Initiator, the Enrollee may have obtained this public key by an OOB communication. The public bootstrapping key of the Initiator may then be used for mutual authentication. Without the public bootstrapping key of the Initiator, only the Initiator can authenticate the Enrollee, but not the other way around.

If the authentication response message indicates that the Responder has accepted the authentication request message and the response meets the criteria imposed by the set-up of the Initiator, the Initiator issues an authentication confirmation message. If the authentication values in the authentication response and the confirmation message are found to be correct by the relevant devices, this part of the protocol, the authentication part, is successful, the process has reached S5 (Authenticated) and configuration can start. The confirmation message may also contain an indication of the result of a previous configuration attempt where the Enrollee is also the Initiator.

In the case of the DPP protocol, the authentication confirmation message is the DPP Authentication Confirm message.

At S6 (Configuration), the Enrollee device sends a configuration request message with information on what type of configuration the Enrollee wants. If the Configurator is able to grant the request, it sends a message with the information needed by the Enrollee such as a network key. In a variant, the configuration request may also contain an indication of the result of a previous configuration attempt.

In the case of DPP, the request message is the DPP Configuration Request and the Configurators response is the DPP Configuration Response message. The DPP Configuration Response may contain the service set identifier (SSID) of the network the Enrollee should connect to and may contain a DPP Connector. The DPP Connector is digitally signed by the Configurator using a key (the C-sign key), and contains among other thing the public network access key of the Enrollee. The Configurator may have obtained the public network access key of the Enrollee from the DPP Authentication Response message sent earlier by the Enrollee and in which message this key is called the public protocol key of the Responder. After successful DPP Authentication, the public protocol key of the Responder gets renamed to public network access key of the Enrollee to indicate its new purpose in the protocol. The DPP Configuration Response message also contains the public signing key of the Configuration. Other devices that have been configured by the same Configurator can thereby check whether they can trust the public network access key of other devices. The DPP Configuration Response message may also contain the Wi-Fi passphrase or Pre Shared Key (PSK) of the network. The Enrollee sends a DPP Configuration Result message (depending on the version of DPP) to the Configurator to let it know whether it accepts the configuration or not. Not receiving this message by the Configurator may indicate to the Configurator that there was a Wi-Fi problem between the Configurator and the Enrollee. Then the 'supposedly configured' Enrollee can send its Connector to a DPP configured AP 2. If the Connectors signature is found correct and if the AP 2 has a matching Connector, i.e. a Connector for the same network, signed by the same Configurator, the AP2 sends its own Connector to the Enrollee. The Enrollee and the AP 2 can compute a symmetric key based on each other's network access key in the Connectors and their own private network access key in Diffie-Hellman fashion.

At S7 (Connection), the Enrollee 4 or 5 attempts to connect to the network. In case of Wi-Fi, the Enrollee will have received a Wi-Fi password or Wi-Fi Pre Shared key (PSK), with which the Enrollee tries to associate with the AP 2 in the normal way through the 4-way handshake as specified in [802.11]. If the connection attempt is successful, the flow passes to S8 (Complete) where it is complete.

In the case of DPP, the actual public keys, e.g. a particular P-256 key, when they are transferred in a message usually contain the type of public key in the structure that contains the public key. An example of an elliptic curve public key represented as the ASN.1 structure called SubjectPublicKeyInfo as specified in section 4.1 of [RFC 5280] is the following in ASN.1 notation:

```
SEQUENCE {
  SEQUENCE {
    OBJECTIDENTIFIER 1.2.840.10045.2.1 (ecPublicKey)
    OBJECTIDENTIFIER 1.2.840.10045.3.1.7 (P-256)
  }
  BITSTRING
  0x0343A6A094A9BC6C9B92CBA3164849F0DB0B91350270ABE80DC554B1E6B3897F30 :
  0 unused
  bit(s)
}
```

Both OBJECTIDENTIFIERs together define the type of public key, while the BITSTRING contains the value of this particular public key.

Currently, and particularly in DPP, the bootstrapping URI contains only one bootstrapping key in DPP R2. This bootstrapping key is the last attribute in the bootstrapping URI. It is of the form:

```
"K:MDkwEwYHKoZIzj0CAQYIKoZIzj0DAQcDIgADM
2206avxHJaHXgLMkq/24e0rsrjMP9K1Tm8gx+ov
P0I=;",
``` where the symbols between the ":" and ";" characters are the base64 encoded ASN.1 SEQUENCE SubjectPublicKeyInfo from [RFC 5280]. Decoding and pretty printing the bootstrapping key representation in the example above yields:

```
SEQUENCE {
  SEQUENCE {
    OBJECTIDENTIFIER 1.2.840.10045.2.1 (ecPublicKey)
    OBJECTIDENTIFIER 1.2.840.10045.3.1.7 (P-256)
  }
  BITSTRING 0x03336db4e9abf11c96875e02cc92aff6e1ed2bb2b7cc3fd2b54e6f20c7ea2f3f42 :
  0 unused
  bit(s)
}
```

When this procedure is performed with devices according to an embodiment, the bootstrapping URI is extended such that additional bootstrapping keys can be added in a backwards compatible fashion, where the additional bootstrapping keys all use different ECC curves. This can be done with a series of one or more attributes appearing anywhere before and all similar to the existing attribute indicated by "K" in the DPP bootstrapping URI, but now indicated with e.g. an "A" instead, so e.g.:

```
"A:MEYwEAYHKoZIzj0CAQYFK4EEACIDMgADBJL3
omc4bW2UHu7FaOs8Tgy0pXL/J6NXgcD9YYxfk
WlSjXvesPGekHMI04f7+Pe9;"
``` for a P-384 bootstrapping key. Decoding and pretty printing the bootstrapping key representation in the example above yields:

```
SEQUENCE {
  SEQUENCE {
    OBJECTIDENTIFIER 1.2.840.10045.2.1 (ecPublicKey)
    OBJECTIDENTIFIER 1.3.132.0.34 (P-384)
  }
  BITSTRING
0x030492f7a267386d6d941eeec568eb3c4e0cb4a572ff27a35781c0fd618c5f9169528d7bdeb0f19e907308d
387fbf8f7bd : 0 unused bit(s)
}
```

In DPP, Elliptic Curve Cryptography [RFC 6090] is used for all asymmetric cryptography, especially the Network Access Key (NAK) and the Configurator signing key, but other forms of asymmetric cryptography, such as the multiplicative group of integers modulo q as described in [DH] where q is prime (referred to in [DH] as "a finite field GF(q) with a prime number q of elements), and $\alpha$ is a primitive root modulo q (referred to in [DH] as "a fixed primitive element of GF(q)), are also possible. All public keys generated with the same value of q and $\alpha$, are considered the same type of public key for the purposes of the present document. Likewise, all public keys that are points on the same elliptic curve are also considered to be of the same type. Public keys that use a different encryption algorithm, e.g. ECC and the multiplicative group of integers modulo q, are considered as different types of public keys. Public keys that use the same encryption algorithm but for which at least one of the defining parameters has a different value are considered a different type of public key for the purposes of the present document. E.g. defining parameters are q and $\alpha$ for the multiplicative group of integers modulo q and the elliptic curve is a defining parameter for the ECC algorithm. In addition to using the OBJECTIDENTIFIERs shown in the above examples, an indication of an elliptic curve can also be given or obtained using an element group which contains the Finite Cyclic Group attribute as specified in clause 8.1.1.12 "Finite Cyclic Group attribute" of [DPP], using the registry maintained by IANA as "Group Description" attributes for IETF RFC 2409 [RFC 2409] and [IKE]. E.g. in the DPP Reconfiguration Announcement message, the element group indicates the type of public key of the Network Access Key in the Connector of the Enrollee.

It should be noted for the purposes of the present disclosure that selecting, comparing, providing, obtaining, receiving, etc. a type of public key is also accomplished when selecting, comparing, providing, obtaining, receiving, etc. a structure, or a blob of data that comprises a public key and the type of public key of that public key. Examples of such structures or blobs of data are been presented herein.

It may happen that the Enrollee fails to connect for some reason. For a complex device 4, the Enrollee may display messages to the user to make them aware of the status and instruct them how to resolve the problems. However, a simple device 5 does not have a UI. If it does not succeed in connecting, it gives up trying after a time-out period for which it is programmed unless it has further programming.

The protocol may require, and indeed DPP does, that the Enrollee return to the Configurator a status message. In the case of DPP, the message is of the form:
Enrollee→Configurator: {E-nonce, DPP Connection Status}$_{ke}$ Upon receipt of the status message, and if indicated status in DPP Connection Status is anything other than STATUS_OK, the Configurator replies with a response message containing an updated (or new) configuration and the Enrollee retries the connection to the network. In terms of DPP, at this S11, there may be an execution of the DPP Configuration Protocol and DPP Introduction Protocol. If this connection is successful, the flow terminates at S8 (Complete).

At S9 (Reconfiguration request), in the case of DPP and of an already configured Enrollee that experiences a problem in connecting to the network it was configured for, the Enrollee may send a reconfiguration request which is termed the DPP Reconfiguration Announcement, and which is of the form:
Enrollee→Configurator: SHA256(C-sign key), group, A-NONCE, E'-id For a simple redoing of the configuration, the flow would pass via S10 (Reconfiguration response). However, this protocol does not handle the situation where the request for a change of key or key type comes from the Configurator. In a normally operating network, a (previously) configured Enrollee is not arranged to receive and process such a request. It will either ignore it or react with an error.

The user could always intervene manually and reset the simple device but this may well be inconvenient in that many of these devices will be installed in hard-to-reach places (e.g. a light bulb in a ceiling socket). Requiring the user to do a manual reset of all of their simple devices is therefore undesirable and a solution based on the Configurator is highly desirable.

In the case of DPP, other problems also exist. The DPP Bootstrapping URI currently can only contain one public key according to the DPP R2 specification [DPP]. A device supporting more than one ECC curve, so more than one bootstrapping key, needs to present somehow more than one QR-code. It is possible to transfer more than one DPP bootstrapping key is transferred by putting more than one Alternative Carrier Record, each containing one DPP bootstrapping URI, in its NFC Handover Request Message, or NFC Handover Select Message, see section 5.4 "NFC" of [DPP].

Having more than one QR-code for more than one ECC curve is, indeed, possible but using this solution would be cumbersome for the user. The user would have to somehow keep a trace of which QR-code to scan so that they do actually scan the QR-code corresponding to the more secure key/key type.

A possible solution for DPP could be that the Configurator performs bootstrapping using P-256, perform the DPP Authentication protocol using P-256, while the DPP Configuration protocol would be changed such that the Configurator asked the Enrollee first to create a new Network Access key (NAK) using another, preferably stronger, curve, e.g. P-384 or P-521. An Enrollee supporting this new curve would do that, supply its new NAK in the adapted DPP Configuration protocol and prove to the Configurator that it possesses the private key belonging to the new NAK. Upon success, the Configurator would put the new Enrollee NAK in a DPP Connector and sign this Connector, possibly with a signing key that is also on a new, e.g. stronger curve, and send the new Connector together with the possibly new Configurator public signing key to the Enrollee in the DPP Configuration Response message.

However, this solution has a fundamental flaw in that the new key/key type is being sent over a connection which has been bootstrapped using encryption that has just been judged insufficient.

Figure 3:
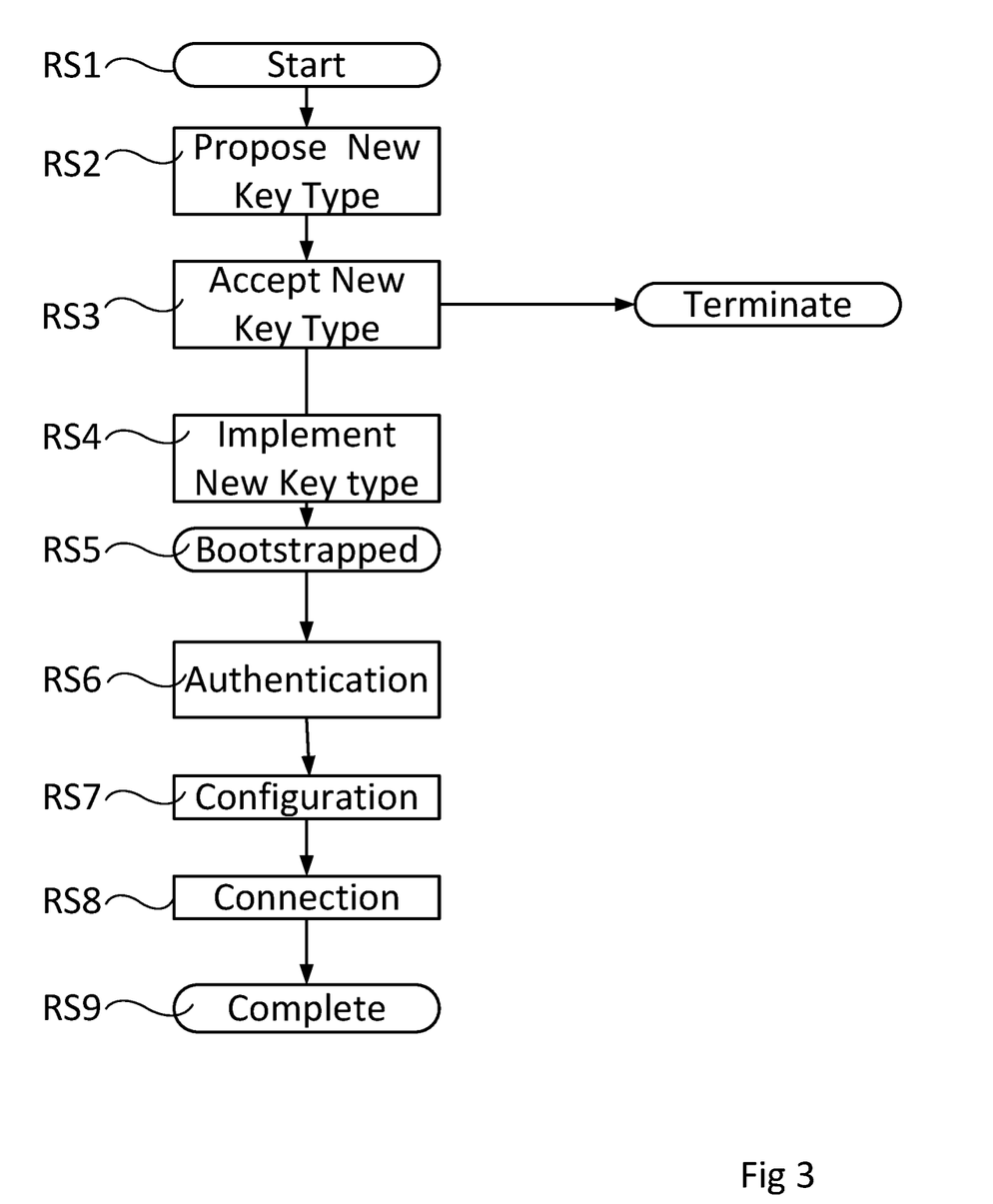
FIG. 3 represents the flow of a reconfiguration process according to an embodiment.

FIG. 3 represents a flow of a protocol for upgrading the encryption of a connection according to an embodiment. This will be described with particular reference to DPP. However, the flow may be applicable to other protocols.

Before the configuration protocol can be started, the devices 4, 5 should be in a state where they are able to engage in the protocol. Simple devices, such as device 5, may often not be programmed to respond to requests to reconfigure if they 'think' they are successfully configured and connected. Many devices like the simple device 5 are arranged to hold only one configuration at a time. Furthermore, many are manufactured without configuration but programmed to reject or ignore further attempts to configure them once they have already been configured—a 'configuration-block', for example a flag which is consulted every time an attempt to configure the device occurs. This behavior has been likened to the process of imprinting in certain animals whereby a young animal learns to recognize one other individual as its 'mother' if it sees that individual at a particular time. Once imprinted, the young animal will refuse to consider any other individuals as its mother. To reconfigure such a device, some sort of reset is required to remove the flag that prevents the device from participating in a configuration process. Such a flag could simply be a status flag with values indicating either 'configured' or 'not configured'. It is also possible that simple devices may have been previously configured for communication by some other means than the configuration protocol such as being configured in the factory. In this example, device 9 and the device 4, 5 are according to embodiments.

At step RS1 (Start), the protocol for upgrading the encryption is started. This involves the Enrollee being (or setting itself) in a state where it is able to be configured. One possible method for this can be either having a dedicated command issued by another device within the network (such as the AP 2) which causes the device 5 to accept reconfiguration.

Another possible method is simply changing the security setup on the network at the side of the AP 2 (or the other complex device, in the case of a peer-to-peer network). If the security setup is changed at the AP 2, for example by changing from using P-256 to P-384, the AP 2 will then reject further connections from the device 4, 5 on the grounds that their connectors are no longer valid. According to an embodiment, the device 4, 5 registers that it is no longer able to connect and resets any 'configured' flags. The device 4, 5 will then be ready for bootstrapping with the new keys/key types. In the case of DPP, it may send out DPP Reconfiguration Announcements, which are of the form:
Enrollee→Configurator: SHA256(C-sign-key), group, A-NONCE, E'-id
where A-NONCE and E'-id are points on the curve of the Configurator signing key (C-sign-key), and group indicates the elliptic curve of the Enrollee Network Access Key for which it received a Connector earlier.

The Configurator signing key in this step is the key with which the Connectors have been signed that the Configurator provisioned the Enrollee with during the previous initial configuration or a previous reconfiguration. This key may be on the same curve as the curve indicated by the group attribute and it may be on a different curve.

In the case of bootstrapping via Near-Field Communications (NFC), the device 4, 5 turns on its NFC radio.

In the case of bootstrapping via Bluetooth™ (BT), for example BT low energy or BLE, the device 4, 5 starts to send out BT (or BLE) Advertisements.

As previously mentioned, currently, and particularly in DPP, the bootstrapping URI contains only one bootstrapping key in DPP R2. This bootstrapping key is the last attribute in the bootstrapping URI. It is of the form:

```
"K:MDkwEwYHKoZIzj0CAQYIKoZIzj0DAQcDIgADM
2206avxHJaHXgLMkq/24e0rsrjMP9K1Tm8gx+ov
P0I=;",
``` where the symbols between the ":" and ";" characters are the base64 encoded ASN.1 SEQUENCE SubjectPublicKeyInfo from [RFC 5280]. Decoding and pretty printing the bootstrapping key representation in the example above yields:

```
SEQUENCE{
   SEQUENCE{
      OBJECTIDENTIFIER 1.2.840.10045.2.1 (ecPublicKey)
      OBJECTIDENTIFIER 1.2.840.10045.3.1.7 (P-256)
   }
   BITSTRING 0x03336db4e9abf11c96875e02cc92aff6e1ed2bb2b7cc3fd2b54e6f20c7ea2f3f42 :
   0 unused
   bit(s)
}
```

According to an embodiment, the bootstrapping URI is extended such that additional bootstrapping keys can be added in a backwards compatible fashion, where the additional bootstrapping keys all use different ECC curves. This can be done with a series of one or more attributes appearing anywhere before and all similar to the existing attribute indicated by "K" in the DPP bootstrapping URI, but now indicated with e.g. an "A" instead, so e.g.

```
"A:MEYwEAYHKoZIzj0CAQYFK4EEACIDMgADBJL3
omc4bW2UHu7FaOs8Tgy0pXL/J6NXgcD9YYxfk
WlSjXvesPGekHMI04f7+Pe9;"
``` for a P-384 bootstrapping key. Decoding and pretty printing the bootstrapping key representation in the example above yields:

```
SEQUENCE {
  SEQUENCE {
    OBJECTIDENTIFIER 1.2.840.10045.2.1 (ecPublicKey)
    OBJECTIDENTIFIER 1.3.132.0.34 (P-384)
  }
  BITSTRING
0x030492f7a267386d6d941eeec568eb3c4e0cb4a572ff27a35781c0fd618c5f9169528d7bdeb0f19e907308
d387fbf8f7bd : 0 unused bit(s)
}
```

At RS2 (Propose New Key Type), in this example, the user of the Configurator wants to use another curve for the Enrollee NAK than that indicated in the 'group' attribute in the received DPP Reconfiguration Announcement. Thus the Configurator transmits the following response called the DPP Reconfiguration Authentication Request message:
Configurator→Enrollee: TransId, Protocol Version, C-Connector, C-nonce
where the C-Connector now contains a Configurator NAK not on the curve indicated by the Enrollee in the 'group' attribute, but on the newly desired curve. The C-Connector is signed still with the signing key that the Enrollee possesses and therefore has to be on the same curve as the attributes A-NONCE and E'-id. This is contrast with the current DPP R2 specification. It may be advantageous to arrange the Configurator to maintain a record of the key/key type used in the previous configuration, described above in steps S1 to S8. In the present example it would be the previously used curve. The configurator could then check that the new curve is indeed stronger and perform an action such as aborting the protocol if this new selection is not stronger the existing configuration or alert the user. Another advantage may be obtained when the Enrollee is according to an embodiment and has provided an extended bootstrapping URI. In this case, the Configurator may remember the curves/keys/key types and select, automatically, one that is stronger than the one in current use. As may be easily understood, this curve/key/key type would have to be used for the other elements in the network.

A legacy Enrollee, i.e. not according to an embodiment, may not be able to continue with the DPP Reconfiguration Authentication protocol at this point. This may be desirable if only devices supporting the better or other security of the new group are to be allowed on the network, but may be undesirable in case the user wishes to be able to still use legacy devices. In the latter case, the legacy devices may be configured to use a network that does not allow access to sensitive information.

Another way to indicate the newly desired curve in the Configurator Connector (C-Connector) in the DPP Reconfiguration Authentication Request message is to add a new JSON attribute-value pair to the DPP Connector indicating this, e.g. "newGroup"="P-384" and use a Configurator NAK on the curve indicated by the group attribute in the DPP Reconfiguration Announcement. An advantage of the latter is that a legacy Enrollee will continue the DPP Reconfiguration Authentication with its NAK on the curve in the group attribute and so can still be configured and perhaps in the latter case only for a network that does not provide access to sensitive information. An example DPP Connector Body Object is the following.

```
{
  "groups":
  [
    {"groupId":"home","netRole":"sta"},
    {"groupId":"cottage","netRole":sta"}
  ],
  "netAccessKey":
  {
    "kty":"EC",
    "crv":"P-256",
    "x":"Xj-zV2iEiH8XwyA9ijpsL6xyLvDiIBthrHO8ZVxwmpA",
    "y":"LUsDBmn7nv-LCnn6fBoXKsKpLGJiVpY_knTckGgsgeU"
  },
  "newGroup"="P-384",
  "expiry":"2022-01-31T22:00:00+02:00"
}
```

By indicating the newly desired curve in these ways, or any other way in the Connector, the DPP Reconfiguration Authentication Request message is protected at this point against forgery by an attacker.

However, an attacker is still able to copy a previously transmitted C-Connector and use it in a forged message. This can be prevented by adding any or both of the two random attributes in the preceding DPP Reconfiguration Announcement, namely A-NONCE and E-id as a new JSON attribute-value pair in the C-Connector. Not all of the bits of these are required, but enough to make it very unlikely that the same bit combination has been used before by a Configurator using the same signing key. An example DPP Connector Body Object in which the first 16 bits of the A-NONCE are included is the following.

```
{
  "groups":
  [
    {"groupId":"home","netRole":"sta"},
    {"groupId":"cottage","netRole":"sta"}
  ],
  "netAccessKey":
  {
    "kty":"EC",
    "crv":"P-256",
    "x":"Xj-zV2iEiH8XwyA9ijpsL6xyLvDiIBthrHO8ZVxwmpA",
    "y":"LUsDBmn7nv-LCnn6fBoXKsKpLGJiVpY_knTckGgsgeU"
  },
  "newGroup"="P-384",
  "aNonceBits"="3FC5"
  "expiry":"2022-01-31T22:00:00+02:00"
}
```

At RS3 (Accept New Key Type), the Enrollee checks the C-Connector, which it is able to, because it possesses the right public signing key of the Configurator. When the Enrollee sees that the NAK in the C-Connector is on a different curve than its own NAK and if the Enrollee supports that curve, it cannot proceed with the DPP Reconfiguration Authentication protocol by sending the DPP Reconfiguration Authentication Response message. Instead, it re-initiates the DPP Authentication protocol (not shown in FIG. 3). The Enrollee can do that by selecting its bootstrapping key that is on this curve and is present in its bootstrapping URI, and using this bootstrapping keys to start transmitting DPP Presence Announcement messages, which is of the form:

Enrollee→Configurator: SHA256("chirp"|BR2)

where BR2 is the Enrollee bootstrapping key on the new curve. While transmitting the DPP Presence Announcement messages, the Enrollee is prepared to receive the DPP Authentication Request message from the Configurator as specified in the DPP specification [DPP]. Optionally, the Enrollee may simply listen for the DPP Authentication Request message from the Configurator without transmitting DPP Presence announcement messages.

If the Enrollee bootstrapping URI is fixed, e.g. it is fixed in an NFC tag, printed in the manual of the Enrollee, on its housing, or made available on the manufacturer's website, the new Enrollee bootstrapping key is a preconfigured one. In case where the Enrollee has a display, or uses peer-to-peer NFC or BLE for (DPP) bootstrapping, it can generate the new Enrollee bootstrapping key and corresponding (DPP) bootstrapping URI at this point and display this or send it over NFC or BLE to the Configurator.

A legacy Enrollee (i.e. not according to an embodiment) will either abort the reconfiguration, or continue with its 'old' NAK, depending on the way the newly desired curve is indicated in the C-Connector. The protocol then terminates at this step (Terminate).

In an embodiment, the Enrollee already having been configured may check the proposed key/type of public key against the key/type of public key it used in the previous configuration.

Yet another advantage of adding the new "newGroup" attribute in the C-Connector is that the Enrollee implemented according to the invention, before it re-initiates the DPP Authentication protocol, can reply in a secured manner with a, DPP Reconfiguration Authentication Response (possibly adapted). This reply is possible because the Configurator NAK in the Connector in the DPP Reconfiguration Authentication Request is now on the same curve as the Enrollee NAK in the Enrollee Connector so the key ke for the encrypted part of the DPP Reconfiguration Authentication Response can be computed by both devices. This secured reply may contain the Enrollee NAK in the Enrollee Connector, which key the Configurator can use to locate the bootstrapping URI of this device that was used during the initial configuration, because this specific Enrollee NAK was during that initial configuration used as the public protocol key of the Enrollee. Thus the Enrollee NAK may serve as an identity of the Enrollee, since the Enrollee uses this key from authentication up to and including runs of the DPP Network Introduction protocol to gain access to a network. The stored bootstrapping URI may contain a bootstrapping key on a curve that the Configurator wants to use. If so, the user of the Configurator does not have to scan a QR code, touch NFC, etc. anymore in step RS4, which has the advantage of being more user friendly. Additionally, to the information already present in the DPP Reconfiguration Authentication Response specified by DPP R2 [DPP], there may be a status field indicating that the Enrollee will go ahead with being configured for the new curve, and/or a bootstrapping key on the new curve. The added information may appear anywhere in the DPP Reconfiguration Authentication Response message, because its entire contents is integrity protected by AES-SIV (Synthetic Initialization Vector (SIV) Authenticated Encryption Using the Advanced Encryption Standard (AES), see [RFC 5297]. Putting the added information in the encrypted part of the DPP Reconfiguration Authentication Response message makes the information also private. Additionally, to the information already present in the DPP Reconfiguration Authentication Response specified by DPP R2 [DPP], the Enrollee may also include an Enrollee bootstrapping key of the by the Configurator newly desired curve type. This Enrollee bootstrapping key should preferably be put in the encrypted part of the DPP Reconfiguration Authentication Response message. The advantage of this is that the user of the Configurator does not have to scan a QR code, touch NFC, etc. anymore in step RS4, which is very user friendly.

At step RS4 (Implement New Key Type), the Configurator either uses one of "NFC touch" for bootstrapping, scanning the QR-code containing the Enrollee bootstrapping URI, which may be located or presented on the device itself, printed on its packaging, printed on its manual, or the Configurator may have stored the Enrollee's bootstrapping URI from when it previously configured the Enrollee or BLE bootstrapping. Touching an NFC tag or scanning a code in the manual or on casing may be a burden for the user so it may be preferable for the user for the Configurator to have stored the bootstrapping URI when bootstrapping with this Enrollee for its first configuration. In case the Configurator has stored the bootstrapping URI from the Enrollee from when it first configured the Enrollee, it is preferable that the Configurator know whether the Enrollee bootstrapping keys are static or not. Only static bootstrapping keys can be used again. The DPP Bootstrapping URI may contain a special attribute indicating whether or not the bootstrapping keys are static or not, e.g. "D:0;" indicating static bootstrapping keys and "D:1;" indicating dynamic bootstrapping keys. When the Configurator stores all bootstrapping URIs or bootstrapping keys of a particular Enrollee, the Configurator should also store together with these URIs or keys an identity of that Enrollee, so when a bootstrapping URI or key of a particular Enrollee is required at e.g. step RS4, the Configurator can select a bootstrapping URI or key from those stored for this particular Enrollee. The DPP protocol key that the Configurator receives from the Enrollee after bootstrapping in the DPP Authentication protocol and which key the Configurator puts as the Enrollee Network Access Key in the Connector it is going to configure the Enrollee with, can serve as such an Enrollee identity.

At step RS5 (Bootstrapped), the Configurator selects the bootstrapping key of the Enrollee from the keys indicated with "K" or "A" that is on the desired ECC curve and proceeds with the DPP Authentication protocol. The devices are now bootstrapped.

At step RS6 (Authentication), the Configurator and Enrollee execute an authentication protocol. In the case of DPP, this is the DPP Authentication protocol as specified in [DPP] and is described in relation to step S4 above. Here, the Configurator acts as Initiator with a DPP Authentication Request message and possibly reacting to the DPP Presence Announcement messages of the Enrollee of step RS3 if these DPP Presence Announcement messages were sent and using the new bootstrapping key of the Enrollee that is on the new curve.

At step RS7 (Configuration), the Configurator and Enrollee execute the DPP Configuration protocol, where the Configurator may want to use a different, e.g. stronger curve for the Configurator signing key than it had to use for signing its C-Connector in step RS2 and may have used for previous configurations of the Enrollee in step S7. For security reasons, the new Configurator signing key should be on a curve that is as strong or even stronger than the newly desired curve for the bootstrapping key and NAK.

At step RS8 (Connection), the Enrollee is configured. If it is an AP, it starts beaconing with the new configuration. If it is not an AP, it starts the DPP Network Introduction protocol and the Network Access protocol in order to connect to the network it is newly configured for based on Network Access Keys on the new, possibly stronger curve. The security strength of the resulting Wi-Fi link encryption is based on the strength of the curve of the NAKs used.

At step RS9 (Complete) the process is complete.

In an another embodiment, at step RS3, the Enrollee does not start sending DPP Presence Announcement messages, but immediately starts the DPP Authentication Protocol as a Responder and waits for the DPP Authentication Request message of the Configurator of step RS6.

In yet another embodiment, at step RS3, the Enrollee does not start sending DPP Presence Announcement messages, but starts the DPP Authentication protocol of step RS7 as Initiator. While possible, this has the disadvantage that the Enrollee needs to know the DPP bootstrapping URI of the Configurator. Enrollees equipped with a rich UI and a sensor for obtaining the DPP Bootstrapping URI of the Configurator will be able to do this. However, headless/simple Enrollees will have difficulty in obtaining the DPP Bootstrapping URI of the Configurator and would require features to enable this. In both cases for this embodiment, it will be a burden to the user to ensure that the Enrollee is able to capture the DPP Bootstrapping URI of the Configurator.

The above method is suitable for configuring an Enrollee device for communications in a wireless network. The method is arranged to be executed by a Configurator device and an Enrollee device, the Configurator and Enrollee devices being arranged to communicate using a wireless communication protocol and participate in a configuration protocol, the configuration protocol being arranged to configure the Enrollee device to communicate in the wireless network, the Enrollee device having been previously configured to communicate in the wireless network. The method comprises executing a configuration protocol, the configuration protocol comprising sending by the Configurator device, using the wireless communication protocol, a message comprising an indication of a selection of a type of public key, the type of public key being selected from a plurality of types of public key obtained, by the Configurator device, from the Enrollee device, wherein the type of public key selected is to be used for a specific purpose and the type of public key selected is different from a previous type of public key used by the Enrollee device for the same specific purpose as part of a previous configuring of the Enrollee device to communicate in the wireless network.

This allows the Configurator and Enrollee devices to agree on a new type of key, preferably a stronger one in cryptographic terms and complete a bootstrapping and authentication protocol. In many situations, the Enrollee devices are arranged to 'lock out' further configuration when they have been successfully configured. Such a measure provides some security from the network in that malicious devices are prevented from using a reconfiguration of a device in the network as a way to gain access. User wishing to reconfigure the network to use stronger cryptography is hence present with the need to reset these Enrollee devices. This, while being a nuisance in itself, may be rendered even more problematic by some device being installed in remote or hard-to-access locations—for example lighting fixtures. The method also allows the reconfiguration to occur using the improved strength cryptography from the outset, as opposed to starting it using the existing, less strong, configuration.

In an embodiment, the message causes a re-initiation of an authentication protocol between the Configurator device and the Enrollee device. By performing a new authentication protocol, the secret keys of Enrollee and Configurator may subsequently be exchanged using the improved strength cryptography.

In an embodiment, the public key of the type of public key is a Device Provisioning Protocol (DPP) Bootstrapping, a network access or protocol key.

In an embodiment, the Configurator device compares the type of public key to an indication of the type of public key stored during a previous configuring of the Enrollee device.

In an embodiment, the Configurator device selects an Enrollee bootstrapping key for use in the re-initiated authentication protocol, wherein the Enrollee bootstrapping key is obtained during a previous configuring of the Enrollee device to communicate in the wireless network. This allows the Configurator to select a new type of key without the potentially burdensome re-acquisition of the types of public key which the Enrollee device may uses. For example, this could avoid having to scan multiple QR-codes.

In an embodiment, the Enrollee device replies to the message from the Configurator device comprising an indication of a selection of a type of public key, the reply message containing an identity of the Enrollee used during a previous configuring of the Enrollee device, the Configurator using the identity of the Enrollee to select the Enrollee key.

This allows the Configurator device to select automatically the Enrollee key in the event that it has keys and key types for multiple Enrollees. This feature may also offer additional security in that if the identity is not recognized as being one previously configured, an alert may be provided to the user. This could occur as a result of a malicious device attempting to join the network or just be a result of an error on the part of the user—for example the Enrollee device was never actually configured. The user may then check for problems and, where applicable, start a completely new configuration by using the appropriate out-of-band method.

In an embodiment, the Enrollee device sends a message comprising a cryptographic hash of information comprising an Enrollee key. Thus causing the authentication to progress.

In an embodiment, the Enrollee device is a simple device. The method allows automatic reconfiguration of even simple or headless devices without the cumbersome requirements of manually resetting such devices.

In an embodiment, the message from the Configurator device comprises an indication that the selection of the type of public key is a new selection. This allows the message to processed by both an Enrollee device according an embodiment and a legacy Enrollee. In such a case, the Enrollee device according to an embodiment will be reconfigured with the new type of public key whereas the legacy device will be able to continue with the type of key public it has been using. This may be useful in networks where lower security devices may be tolerated because them having a limited role.

The Enrollee device 4, 5 according to an embodiment is arranged to be re-configured by a Configurator device 9 for communication in a wireless network, the Enrollee device 4, 5 may be arranged to participate in a configuration protocol, the configuration protocol being arranged to configure an un-configured Enrollee device. The Enrollee device 4, 5 may provide a plurality of types of public key arranged to be used in the configuration protocol and provide at least one public key for each type of public key provided, connect to a network as a result of being configured, to set itself to a state able to be configured as a result being unable to connect to the network, and to receive a message, and to use a type of public key selected by the Configurator device from the plurality of types of public key in the configuration protocol and where receipt of the message causes a re-initiation of an authentication protocol between the Configurator device and the Enrollee device. This allows the Enrollee device to participate in the reconfiguration without a manual reset and without the exchange of any secret keys over connections using less secure cryptography.

In an embodiment, the Enrollee device 4, 5 may be configured to reply to the message from the Configurator device 9 with a reply message comprising in indication of the identity of the Enrollee device, the identity of the Enrollee device having been used during a previous configuring of the Enrollee device.

The Configurator device 9 according to an embodiment may be arranged to re-configure an Enrollee device 4, 5 for communication in a wireless network, the device comprising a transceiver arranged for transceiving according to a communication protocol, the device being arranged to participate in a configuration protocol, obtain, from the Enrollee device, an indication of a plurality of types of public key to be used as part of the configuration protocol, select a type of public key from the indication, wherein the type of public key selected is to be used for a specific purpose and the type of public key selected is different from the type of public key used by the Enrollee device for the same specific purpose as part of a previous configuring of the Enrollee device to communicate in the wireless network, and send a message, using the transceiver, to the Enrollee device, the message comprising an indication of a type of public key selected, by the Configurator, from the plurality of types of public key.

A Configurator device 9 so-arranged may be able to automatically detect that the Enrollee device is ready to engage in what is a reconfiguration with an Enrollee device according to an embodiment. The Configurator device 9 may be able to select a new type of key, such as a new curve, without the user having to intervene manually—such as scanning multiple QR-codes. Particularly, this avoids the user having to engage in any trial and error processes of finding a new curve for bootstrapping that the Enrollee device can accept.

In an embodiment, the configurator device is arranged to obtain and store the plurality of types of public key and at least one public key according to an obtained type of public key during a previous configuring of the Enrollee device to communicate in the wireless network.

In an embodiment, the Configurator device 9 may be arranged to select the public key from the stored plurality of public keys. The advantage of having the Configurator store the types of key for a possible future use is that the user no longer has to find information relating to the Enrollee device (such as QR-codes), information which may be hard to find since the initial installation.

In an embodiment, the Configurator device is arranged to receive and process a reply message from the Enrollee device, the reply message comprising an indication of Enrollee device identity to select a type of public key from the stored plurality types of public key.

The advantage of a system composed of a Configurator device and an Enrollee device according to an embodiment, particularly when the Enrollee is a simple device, is that network containing the Enrollee device may have its security upgraded i.e. the encryption strengthened in a convenient manner. By 'convenient' it may be understood that the Enrollee may be reconfigured to connect to the network without a cumbersome and manual intervention on the part of the user on the Enrollee device.

Figure 4A:
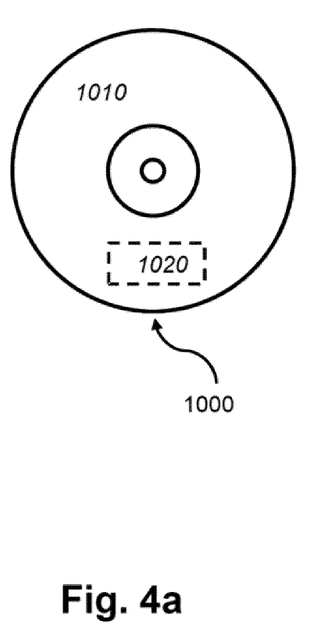
FIG. 4a shows a computer readable medium.

FIG. 4a shows a computer readable medium 1000 having a writable part 1010 comprising a computer program 1020, the computer program 1020 comprising instructions for causing a processor system to perform one or more of the above methods and processes in the system as described with reference to FIGS. 1-3. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 4B:
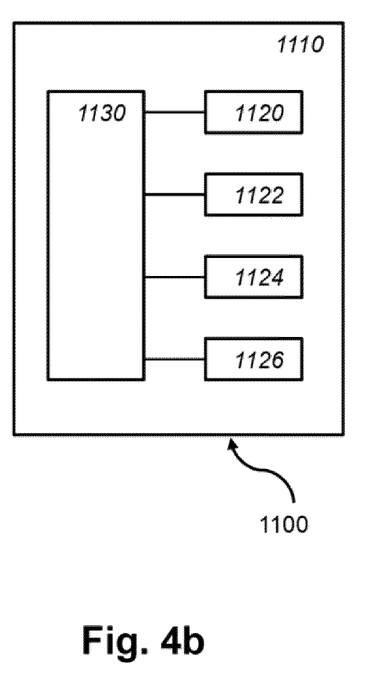
FIG. 4b shows in a schematic representation of a processor system.

FIG. 4b shows in a schematic representation of a processor system 1100 according to an embodiment of the device or methods as described with reference to FIGS. 1-3. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, a transceiver, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

Since both Configurator and Enrollee device have to handle adapted messages, they must be programmed accordingly to parse the messages correctly. It should be understood that this adds complexity and lengthens the execution time for the Configurator. There is also added complexity on the Enrollee side in that more complicated firmware and larger non-volatile memory are required. It should be borne in mind that there is great downward price pressure on such devices and even apparently small additions demand justification. Furthermore, many such devices are battery-powered and any extra energy expenditure, such as retrieving information, composing more complex messages and sending those more complex and longer messages is actively discouraged, particularly where the batteries are small and intended to last a long time. Lastly, changing the protocol often involves other modifications to allow handling of legacy devices.

Aspects of the embodiments may be implemented in a computer program product, which may be a collection of computer program instructions stored on a computer readable storage device which may be executed by a computer. The instructions may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of non-volatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The following may be used as reference documents:

[802.11] IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), December 2016

[DH] Diffie, W.; Hellman, M. (1976), "New directions in cryptography", IEEE Transactions on Information Theory, 22 (6): 644-654

[DPP] Device Provisioning Protocol—Technical Specification—Version 1.0, Wi-Fi Alliance, 2018, https://www.wi-fi.org/file-member/device-provisioning-protocol-specification.

[FIPS180-4] FIPS180-4, "Secure Hash Standard", United States of America, National Institute of Standards and Technology, Federal Information Processing Standard (FIPS) 180-4

[IKE] Internet Key Exchange (IKE) Attributes, Group Description (Value 4), https://www.iana.org/assignments/ipsec-registry/ipsec-registry.xhtml#ipsec-registry-10

[RFC 2409] RFC 2409, The Internet Key Exchange, November 1998, https://datatracker.ietf.org/doc/rfc2409/.

[RFC 5280] RFC 5280, Internet X.509 Public Key Infrastructure Certificate and Certificate Revocation List (CRL) Profile, https://datatracker.ietf.org/doc/rfc5280/

[RFC 5297] Synthetic Initialization Vector (SIV) Authenticated Encryption Using the Advanced Encryption Standard (AES), October 2008, https://datatracker.ietf.org/doc/rfc5297/.

[RFC 6090] RFC 6090, Fundamental Elliptic Curve Cryptography Algorithms, February 2011 https://datatracker.ietf.org/doc/rfc6090/.

The invention claimed is:

1. A method of configuring an enrollee device for communications in a wireless network, the method being arranged to be executed by a configurator device and an enrollee device the configurator device and the enrollee device being arranged to communicate using a wireless communication protocol and participate in a configuration protocol, the configuration protocol being arranged to configure the enrollee device to communicate in the wireless network, the enrollee device having been previously configured to communicate in the wireless network, and the method comprising:

executing a configuration protocol, the configuration protocol comprising sending by the configurator device, using the wireless communication protocol, a message comprising an indication of a selection of a type of public key, the type of public key being selected from a plurality of types of public key obtained, by the configurator device, from the enrollee device, wherein the type of public key selected is to be used for a specific purpose and the type of public key selected is different from a previous type of public key used by the enrollee device for the same specific purpose as part of a previous configuring of the enrollee device to communicate in the wireless network, and wherein the configurator device compares the type of public key to an indication of the type of public key stored during a previous configuring of the enrollee device.

2. The method of claim 1, wherein the message causes a re-initiation of an authentication protocol between the configurator device and the enrollee device.

3. The method of claim 1, wherein the public key of the type of public key is a Device Provisioning Protocol (DPP) Bootstrapping, a network access, or protocol key.

4. The method of claim 1, wherein the configurator device selects an enrollee bootstrapping key for use in the re-initiated authentication protocol, and wherein the enrollee bootstrapping key is obtained during a previous configuring of the enrollee device to communicate in the wireless network.

5. The method of claim 1, wherein the enrollee device replies to a message from the configurator device comprising an indication of a selection of a type of public key, wherein the reply message containing comprises an identity of the enrollee device used during a previous configuring of the enrollee device, and wherein the configurator device uses using the identity of the enrollee device to select the enrollee key.

6. The method of claim 1, wherein the enrollee device sends a reply message to a message from the configurator device comprising an indication of a selection of a type of public key, wherein the reply message containing comprises an enrollee key of a type present in the indication of a selection of a type of public key, and wherein the configurator device and the enrollee device use using the enrollee key during the reinitiated authentication protocol between the configurator device and the enrollee device.

7. The method of claim 1, wherein the enrollee device sends a message comprising a cryptographic hash of information comprising an enrollee key.

8. The method of claim 1, wherein the enrollee device is a simple device.

9. The method of claim 1, wherein the message from the configurator device comprises an indication that the selection of the type of public key is a new selection.

10. The method of claim 1, wherein the configuration protocol is according the Device Provisioning Protocol (DPP).

11. An enrollee device arranged to be re-configured by a configurator device for communication in a wireless network, the enrollee device being arranged to:

participate, by one or more computer processors, in a configuration protocol, the configuration protocol being arranged to configure an un-configured the enrollee device;

provide, by one or more computer processors, a plurality of types of public key arranged to be used in the configuration protocol and provide at least one public key for each type of public key provided;

connect to a network as a result of being configured to; set itself to a state able to be configured as a result of being unable to connect to the network;

receive a message from the configurator device, and
use a type of public key selected by the configurator device from the plurality of types of public key in the configuration protocol;
wherein receipt of the message causes a re-initiation of an authentication protocol between the configurator device and the enrollee device, and
wherein the enrollee device is configured to reply to the message with a reply message comprising an indication of the identity of the enrollee device, the identity of the enrollee device having been used during a previous configuring of the enrollee device.

12. The enrollee device of claim 11, wherein the enrollee device is arranged to send a reply message to a message from the configurator device comprising an indication of a selection of a type of public key, the reply message containing an enrollee key of a type present in the indication of a selection of a type of public key,
wherein the enrollee device is arranged to use the enrollee key during the re-initiated authentication protocol between the configurator device and the enrollee device.

13. The enrollee device of claim 11, wherein the enrollee device is a simple device.

14. A device arranged to act as a configurator device and being arranged to re-configure an enrollee device for communication in a wireless network, the device comprising a transceiver arranged for transceiving according to a communication protocol, the device being arranged to:
participate in a configuration protocol;
obtain, from the enrollee device, an indication of a plurality of types of public key to be used as part of the configuration protocol;
select a type of public key from the indication, wherein the type of public key selected is to be used for a specific purpose and the type of public key selected is different from the type of public key used by the enrollee device for the same specific purpose as part of a previous configuring of the enrollee device to communicate in the wireless network, and wherein the public key and at least one public key is obtained and stored according to an obtained type of public key during a previous configuring of the enrollee device to communicate in the wireless network;
send a message, using the transceiver, to the enrollee device, the message comprising an indication of a type of public key selected, by the configurator device, from the plurality of types of public key; and
obtain and store the plurality of types of public key and at least one public key according to an obtained type of public key during a previous configuring of the enrollee device to communicate in the wireless network.

15. The device of claim 14, wherein the message causes a re-initiation of an authentication protocol between the configurator device and the enrollee device.

16. The device of claim 14, arranged to select the public key from the stored plurality of public keys.

17. The device of claim 14, wherein the enrollee device is arranged to send a reply message to a message from the configurator device comprising an indication of a selection of a type of public key, the reply message containing an enrollee key of a type present in the indication of a selection of a type of public key,
wherein the enrollee device is arranged to use the enrollee key during the re-initiated authentication protocol between the configurator device and the enrollee device.

18. The device of claim 14, wherein the configurator device is arranged to receive and process a reply message from the enrollee device, the reply message comprising an indication of enrollee device identity to select a type of public key from the stored plurality types of public key.

19. The device of claim 14, wherein the configurator device is arranged to include an indication that the selection of a type of public key is a new selection.

* * * * *